(12) United States Patent
Lee et al.

(10) Patent No.: US 9,571,848 B2
(45) Date of Patent: Feb. 14, 2017

(54) DEVICE AND METHOD FOR COMPRESSING/DECOMPRESSING LENS SHADING COMPENSATION COEFFICIENT

(71) Applicant: SK hynix Inc., Gyeonggi-do (KR)

(72) Inventors: Kyung-Ho Lee, Gyeonggi-do (KR);
Sang-Dong Yoo, Gyeonggi-do (KR);
Jong-Suk Lee, Gyeonggi-do (KR);
Jung-Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 189 days.

(21) Appl. No.: 14/560,858

(22) Filed: Dec. 4, 2014

(65) Prior Publication Data

US 2016/0028975 A1    Jan. 28, 2016

(30) Foreign Application Priority Data

Jul. 22, 2014   (KR) ........................ 10-2014-0092303

(51) Int. Cl.
*G06K 9/36* (2006.01)
*H04N 19/463* (2014.01)

(52) U.S. Cl.
CPC .................................. *H04N 19/463* (2014.11)

(58) Field of Classification Search
USPC . 382/166, 162, 274, 232, 233; 1/1; 348/251, E5.034, E5.078
See application file for complete search history.

(56) References Cited

U.S. PATENT DOCUMENTS 8,804,013 B2 *   8/2014   Park ..................... H04N 5/3572
                                                            348/251
9,256,959 B1 *   2/2016   Li ........................... G06T 7/408

FOREIGN PATENT DOCUMENTS

WO    WO 2007075066    *   7/2007   ............... H04N 1/40

* cited by examiner

*Primary Examiner* — Anh Do
(74) *Attorney, Agent, or Firm* — IP & T Group LLP (57) ABSTRACT

A lens shading compensation coefficient compression device includes: a first differential block suitable for calculating a lens shading compensation coefficient between color channels and removing redundancy between the color channels; a second differential block suitable for calculating a lens shading compensation coefficient within color channels and removing redundancy within the color channels; and an entropy coding block suitable for performing entropy coding on remaining lens shading compensation coefficients and compressing the lens shading compensation coefficients.

17 Claims, 9 Drawing Sheets

DEVICE AND METHOD FOR COMPRESSING/DECOMPRESSING LENS SHADING COMPENSATION COEFFICIENT

CROSS-REFERENCE TO RELATED APPLICATIONS

The present application claims priority of Korean Patent Application No. 10-2014-0092303, filed on Jul. 22, 2014, which is incorporated herein by reference in its entirety.

BACKGROUND

1. Field

Various embodiments of the present invention relate to a lens shading compensation coefficient compression/decompression device and a method for compressing/decompressing lens shading compensation coefficients of a Complementary Metal Oxide Semiconductor (CMOS) Image Sensor (CIS). More particularly, to a lens shading compensation coefficient compression/decompression device and a method for compressing/decompressing lens shading compensation coefficients by using a lens shading compensation coefficient compression scheme and entropy coding between and within color channels.

2. Description of the Related Art

Since Lens Shading Compensation Coefficient (LSCC) having a one-dimensional (1D) structure is generally used for Lens Shading Compensation (LSC) of a Complementary Metal Oxide Semiconductor (CMOS) Image Sensor (CIS), the amount of data used in the LSCC is small. Thus, data compression is not required.

As the CIS is improved from lower resolutions to higher resolutions, more detailed and accurate LSC is necessary. However, the typical solution simply changes the LSCC to a two-dimensional (2D) structure, having an increased amount of data, and stores the LSCC.

Since the typical LSC method uses more data, the non-volatile memory capacity required and the chip area it occupies also increase. Therefore, it is a goal of the semiconductor industry to find ways to efficiently implement the CIS, reducing the amount of information that needs to be stored and minimizing the area required for storage space.

SUMMARY

Various embodiments of the present invention are directed to a lens shading compensation coefficient compression/decompression device and method for compressing/decompressing lens shading compensation coefficients. This may be accomplished by entropy coding that removes redundancy between and within color channels, decreasing the amount of data required to store the lens shading compensation coefficients.

In accordance with an embodiment of the present invention, a lens shading compensation coefficient compression device includes: a first differential block suitable for calculating differentials between color channels; a second differential block suitable for calculating differentials within color channels; and an entropy coding block suitable for performing entropy coding on lens shading compensation coefficients.

The lens shading compensation coefficient compression device may further include a third differential block suitable for predicting and removing remaining lens shading compensation coefficient redundancy.

The third differential block may perform a differential operation with each color channel based on pixel distance weighted values.

The first differential block sets one color channel as a reference channel, may calculate the lens shading compensation coefficient differentials between the color channels through a differential operation, and remove redundancy between the color channels.

The second differential block may calculate the lens shading compensation coefficient differentials within the color channels through a differential operation between the lens shading compensation coefficients within the color channels.

The second differential block may perform Differential Pulse Code Modulation (DPCM) using spiral scanning based on a center point of pixels.

The entropy coding block may obtain compressed data by performing the entropy coding on remaining lens shading compensation coefficients and combines syntax information for the lens shading compensation coefficients and the compressed data as one bit stream.

In accordance with another embodiment of the present invention, a lens shading compensation coefficient compression method includes: calculating lens shading compensation coefficient differentials between color channels and removing redundancy between the color channels; calculating lens shading compensation coefficient differentials within color channels and removing redundancy within the color channels; and performing entropy coding operations on remaining lens shading compensation coefficients and compressing the lens shading compensation coefficients.

The lens shading compensation coefficient compression method may further include calculating and removing remaining lens shading compensation coefficient redundancy after the calculating of the lens shading compensation coefficient differentials between the color channels and the removing of the redundancy within the color channels.

A Differential Pulse Code Modulation (DPCM) using spiral scanning based on a center point of the pixels is performed in the calculating of the lens shading compensation coefficient between the color channels and the removing of the redundancy within the color channels.

In accordance with another embodiment of the present invention, a lens shading compensation coefficient compression device Includes: a syntax decoding block suitable for parsing a bit stream and extracting information required for calculating differentials; a second compensation block suitable for calculating and compensating a lens shading compensation coefficient within color channels; and a third compensation block suitable for calculating and compensating a lens shading compensation coefficient between color channels.

The lens shading compensation coefficient decompression device may further include: a first compensation block suitable for calculating and compensating a remaining lens shading compensation coefficient.

In accordance with another embodiment of the present invention, a lens shading compensation coefficient decompression method includes: parsing a bit stream and extracting information required for respective differentials; calculating and compensating a lens shading compensation coefficient within color channels; and calculating and compensating a lens shading compensation coefficient between color channels.

The lens shading compensation coefficient decompression method may further include: calculating and compensating a remaining lens shading compensation coefficient after the parsing of the bit stream and the extracting of the information required for the respective differentials.

In accordance with another embodiment of the present invention, a lens shading compensation coefficient decompression method includes: calculating differentials of lens shading coefficients between color channels; calculating differentials of lens shading coefficients within color channels; composing data, which includes the calculated differentials between and within the color channels; and entropy encoding the data.

The lens shading compensation coefficient decompression method may further include calculating differentials based on distance weighted values.

A distance used in the distance weighted values may be measured from a center of pixels.

The data that is entropy encoded may further include the differentials calculated based on distance weighted values.

The calculating differentials of lens shading coefficients within color channels may be accomplished using Differential Pulse Code Modulation (DPCM).

BRIEF DESCRIPTION OF THE DRAWINGS

FIGS. 1A and 18 illustrate a three-axis mapping of a lens shading compensation coefficient.

DETAILED DESCRIPTION

Various embodiments of the present invention are described below in detail with reference to the accompanying drawings. These embodiments are provided so that this disclosure is thorough and complete, and fully conveys the scope of the present invention to those skilled in the art. All "embodiments" referred to in this disclosure refer to embodiments of the inventive concept disclosed herein. The embodiments presented are merely examples and are not intended to limit the inventive concept.

It is also noted that in this specification, "connected/coupled" refers to one component not only directly connected/coupled to/with another component but also indirectly connected/coupled to/with another component through an intermediate component. In addition, "include/comprise" or "including/comprising" used in the specification represents that one or more components, steps, operations, and elements exist or are added. Furthermore, a singular form may include a plural form as long as it is not specifically mentioned in a sentence.

Figure 1A:
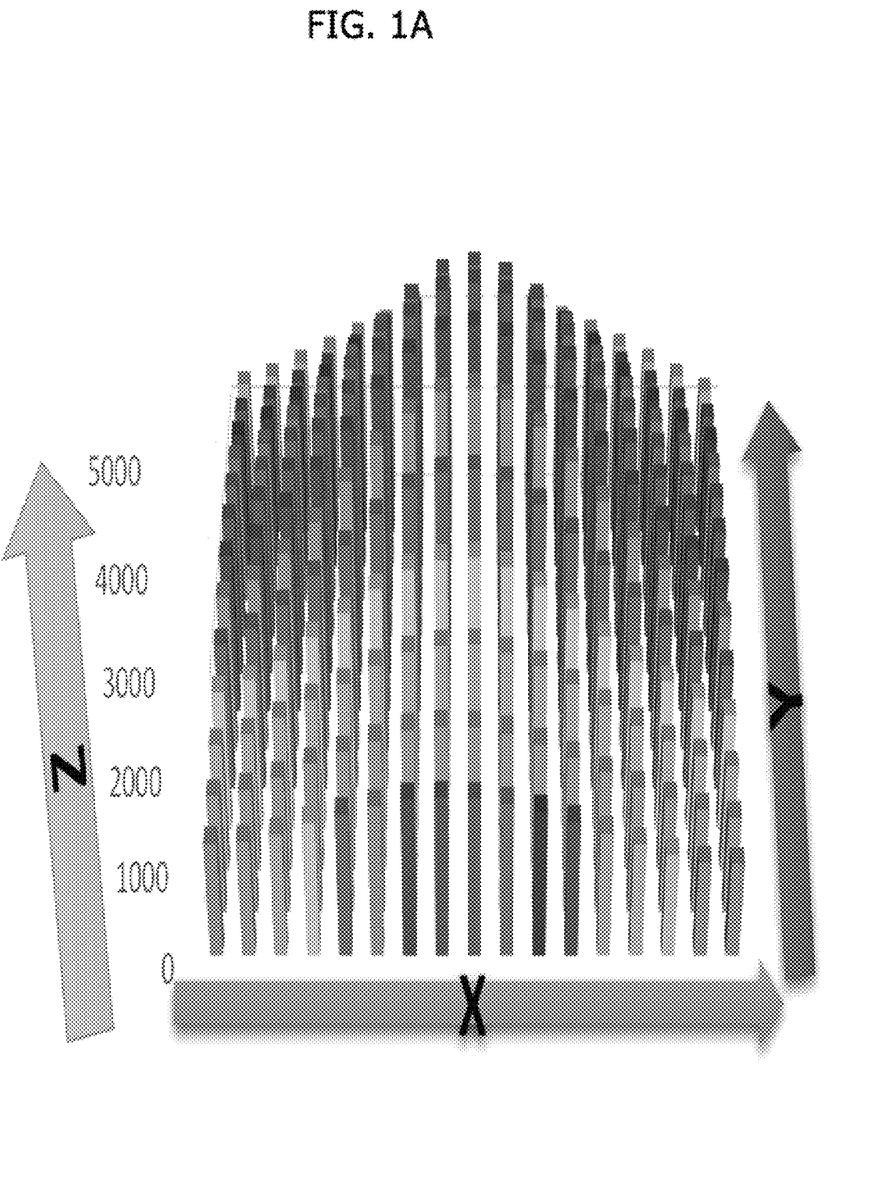
Figure 1B:
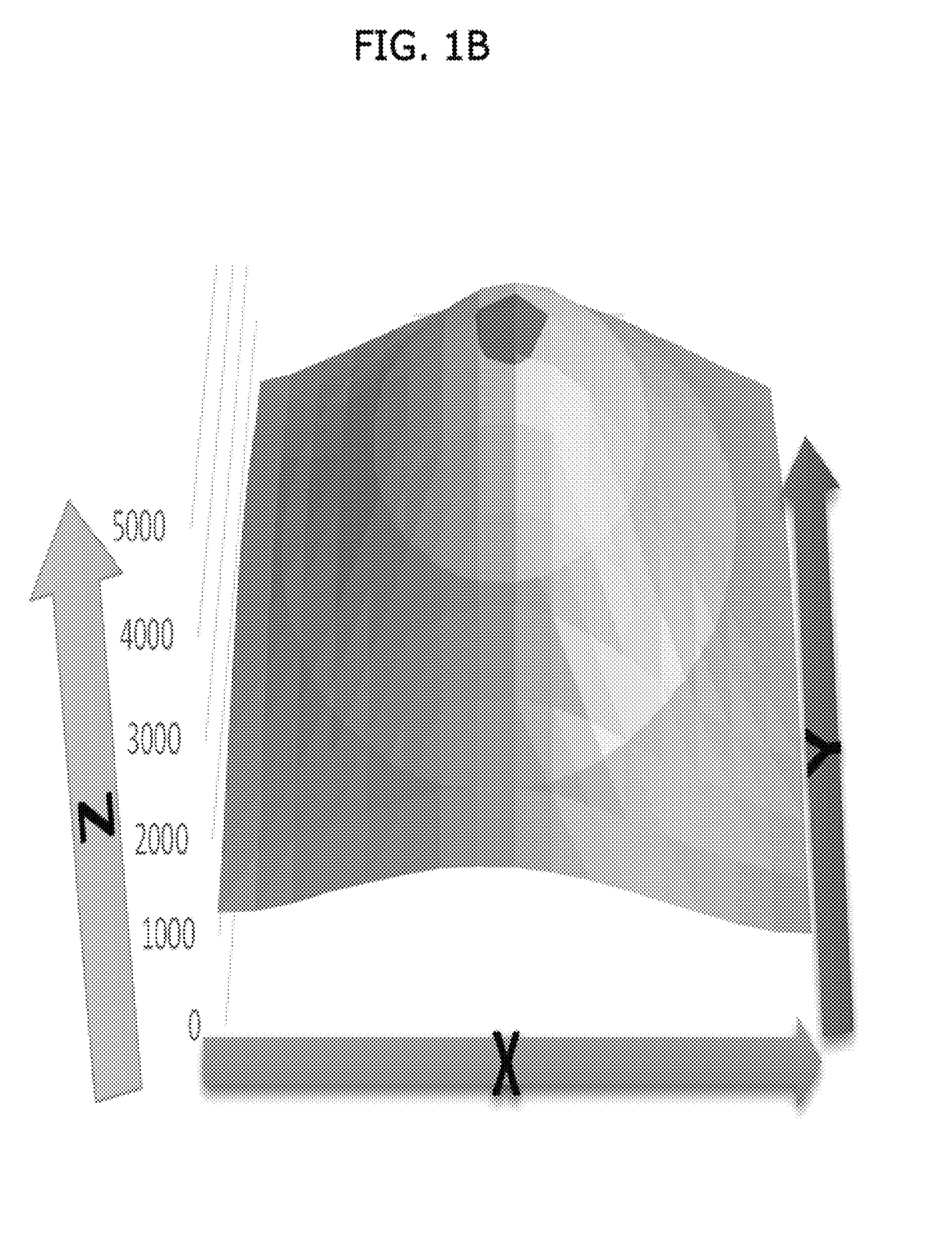

FIGS. 1A and 18B illustrate a three-axis mapping of lens shading compensation coefficients.

Three-axis mapping of lens shading compensation coefficients may be represented by a three-dimensional (3D) bar graph, as illustrated in FIG. 1A, and when transformed into a two-dimensional (2D) shape, the three-axis mapping of the lens shading compensation coefficients may be represented by a 2D mesh graph, as illustrated in FIG. 1B.

As Complementary Metal Oxide Semiconductor (CMOS) Image Sensors (CIS) go from lower resolution to higher resolution, to maintain performance, it is necessary to use lens shading compensation methods that are two-dimensional, rather than one-dimensional linear coefficients.

However, 2D lens shading compensation coefficients require storage of more data. Thus, the area occupied by the CIS and its non-volatile memory, for example, SRAM, which stores the lens shading compensation coefficients, also increases.

Methods for compressing lens shading compensation coefficients do not currently exist. Therefore, the embodiments of the present invention are directed to a lossless lens shading compensation coefficient compression technique that decreases the amount of data required for storing lens shading compensation coefficients, as well as a lossless technique for lens shading compensation coefficient decompression.

That is, the amount of data required for storing the lens shading compensation coefficients may decrease, and the storage requirements and occupied area of the non-volatile memory in the CIS may also decrease as the lens shading compensation coefficients are compressed. Further compression may be accomplished through entropy coding operations after the data range of the lens shading compensation coefficient is reduced by using a lens shading compensation coefficient differential scheme between color channels. The lens shading compensation coefficient decompression technique is carried out in a reverse fashion to the lens shading compensation coefficient compression technique.

Figure 2:
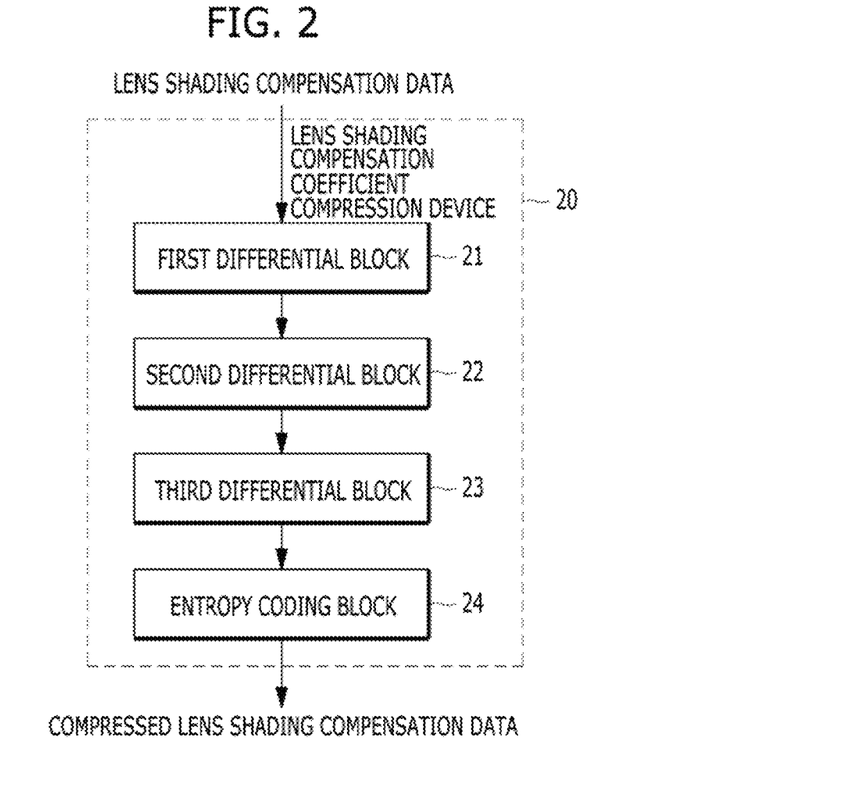
FIG. 2 is a block diagram illustrating a lens shading compensation coefficient compression device in accordance with an embodiment of the present invention.

FIG. 2 is a block diagram illustrating a lens shading compensation coefficient compression device in accordance with an embodiment of the present invention.

An embodiment of the present invention includes two lens shading compensation coefficient differential schemes, and possibly a third. This includes a lens shading compensation coefficient differential scheme between color channels, a lens shading compensation coefficient differential scheme within color channels, and an entropy coding scheme for encoding the remaining lens shading compensation coefficients. Additionally, the embodiments of the present invention may further include a remaining lens shading compensation coefficient differential scheme based on weighted values.

Referring to FIG. 2, a lens shading compensation coefficient compression device 20 includes a first differential block 21, a second differential block 22, a third differential block 23, and an entropy coding block 24. The first differential block 21 calculates differentials of the lens shading compensation coefficients between color channels. The second differential block 22 calculates lens shading compensation coefficient differential within color channels. The third differential block 23 removes the remaining redundancy in the lens shading compensation coefficients. The entropy coding block 24 performs entropy coding operations on the remaining lens shading compensation coefficients and compresses the lens shading compensation coefficients. The third differential block 23 is an optional constituent element.

Each of the aforementioned constituent elements is described in detail below with reference to FIGS. 3 to 6B.

The first differential block 21 selects one color channel from the inputted lens shading compensation data as a reference channel. The lens shading compensation data generally comes in the form of an array. The first differential block 21 then reduces the magnitude of the lens shading compensation coefficients by measuring the color channels with reference to a reference channel.

For example, the first differential block 21 selects the GB channel as the reference channel. Channel differentiation is accomplished by a one-to-one differential calculation between the reference channel and the other color channels, such as, a GR channel, a Red channel and a Blue channel.

Figure 3:
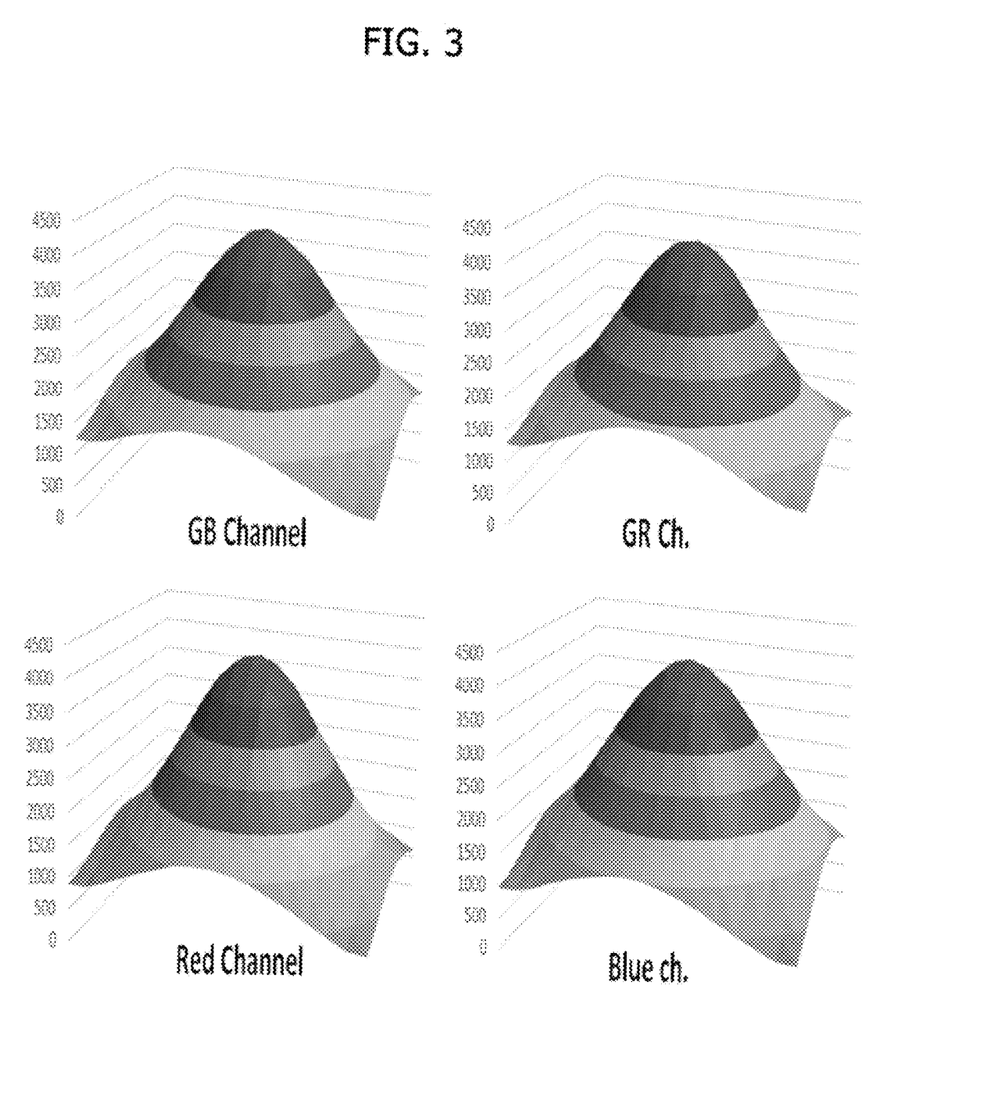
FIG. 3 is a distribution diagram illustrating a lens shading compensation coefficient for four color channels.
Figure 4:
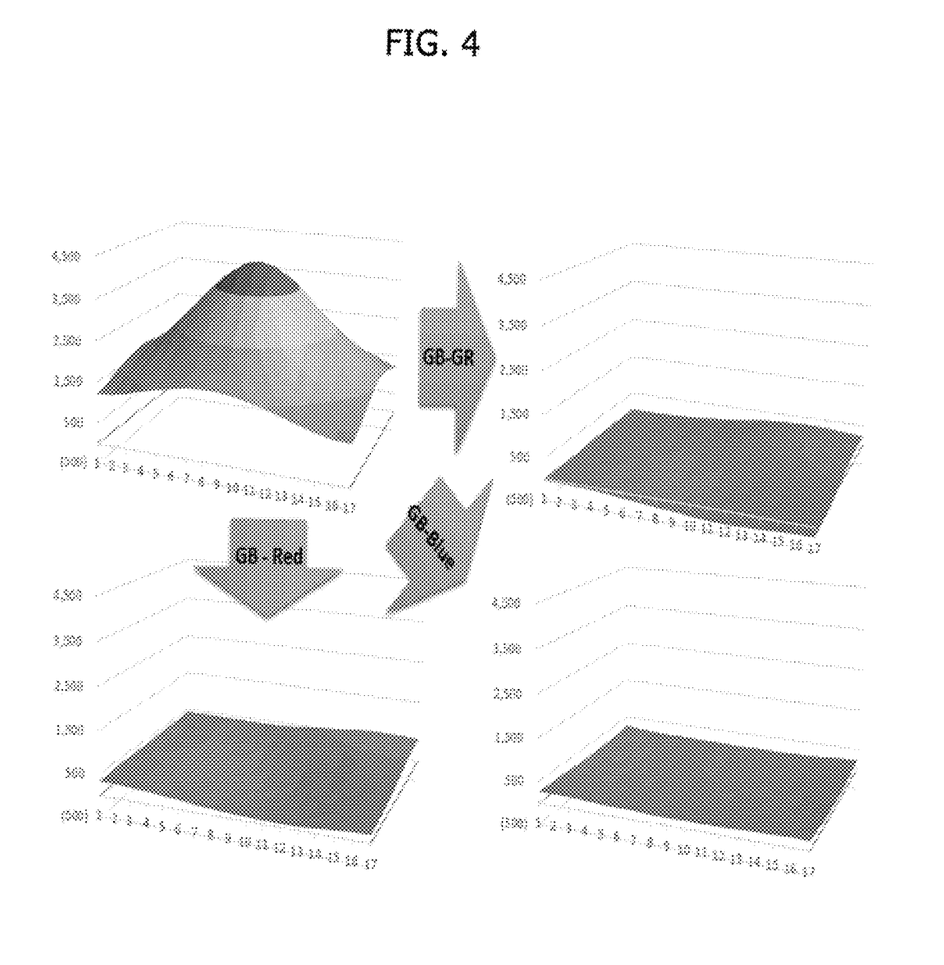
FIG. 4 is a distribution diagram Illustrating a one-to-one differential operation between a GB channel and three color channels.

As illustrated in FIG. 3, the lens shading compensation coefficients for the color channels, that is, the GB channel, the GR channel, the Red channel, and the Blue channel, have similar distributions. Since all the pixels in the CIS receive generally the same light source, divided through a color filter array, the coefficients tend to have similar distributions. The lens shading compensation coefficients shown in a 2D mesh shape, as illustrated in FIG. 4, are similar to the successive video images, and the first differential block 21 calculates the differentials by performing a one-to-one differential operation between the three other color channels, as shown in Equation 1 below, using the GB channel as a frame of reference. The GB channel is used as a reference since it has green image data, which is very important since the human eye is most sensitive to the color green. However, the other channels could also potentially be used as a reference.

Reference channel: GB frame

Differential target channel: GR frame, Blue frame and Red frame

Differential $GB\text{-}GR(x,y) = GB\_frame(x,y) - GR\_frame(x,y)$

Differential $GB\text{-}Blue(x,y) = GB\_frame(x,y) - Blue\_frame(x,y)$

Differential $GB\text{-}Red(x,y) = GB\_frame(x,y) - Red\_frame(x,y)$  Equation 1

Using these equations, embodiments of the present invention may remove redundancy, that is, reducing the magnitude of the compensation coefficients, between the color channels by performing a one-to-one differential operation between the reference channel and the other three color channels after setting the GB channel as the reference channel.

The second differential block 22 compresses the lens shading compensation coefficients within the color channels by performing a differential operation between the lens shading compensation coefficients within the color channels.

Figure 5:
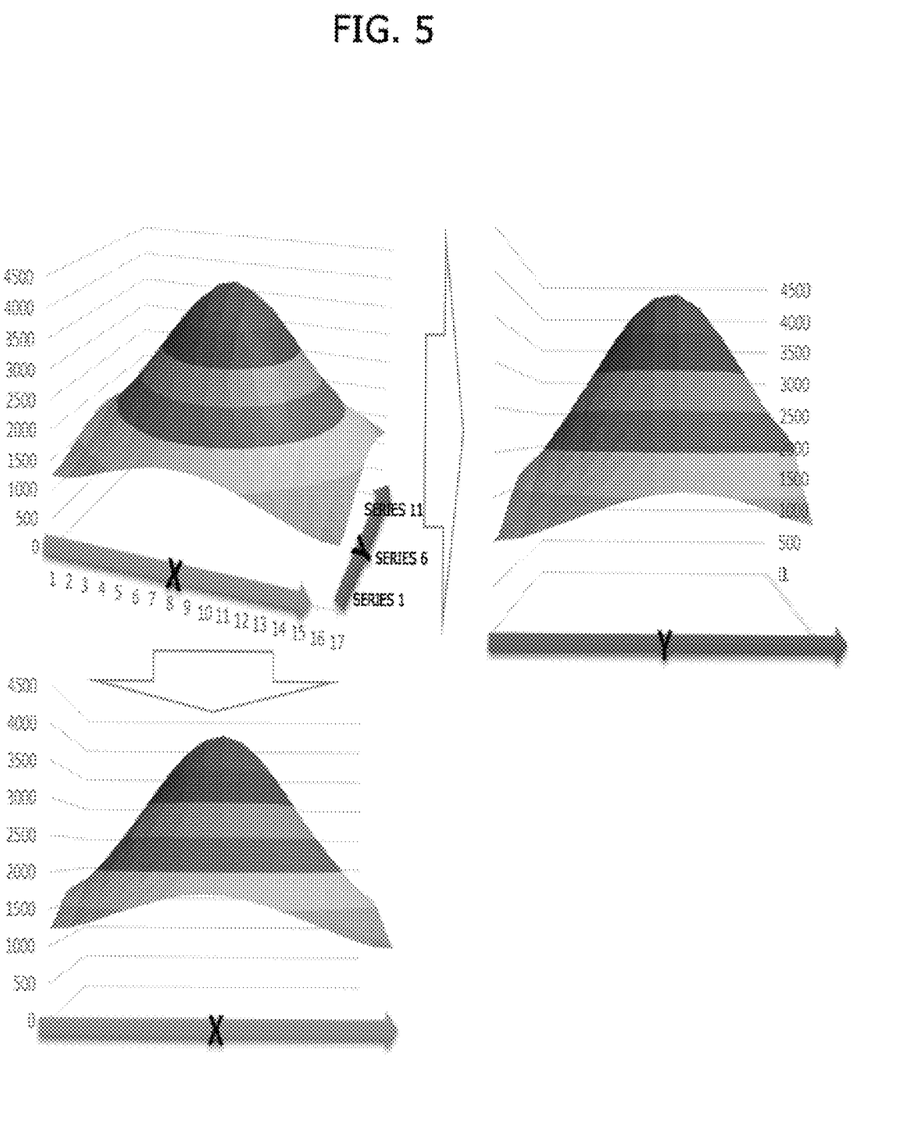
FIG. 5 is a distribution diagram Illustrating the difference between successive lens shading compensation coefficients on a Gaussian distribution basis and a center point of a lens shading compensation coefficient.

For example, the second differential block 22 performs a Differential Pulse Code Modulation (DPCM) using spiral scanning based on the center points of the four color channels, such as, a GB channel and three differential channels, to decrease the amount of data required by reducing the magnitude of the color channel lens shading coefficients. As illustrated in FIG. 5, since the lens shading compensation coefficients have a shape similar to a Gaussian distribution, and the difference between successive lens shading compensation coefficients is quite small, redundancy in the color channels is removed, and the amount of data decreases when the DPCM is performed.

Figure 6A:
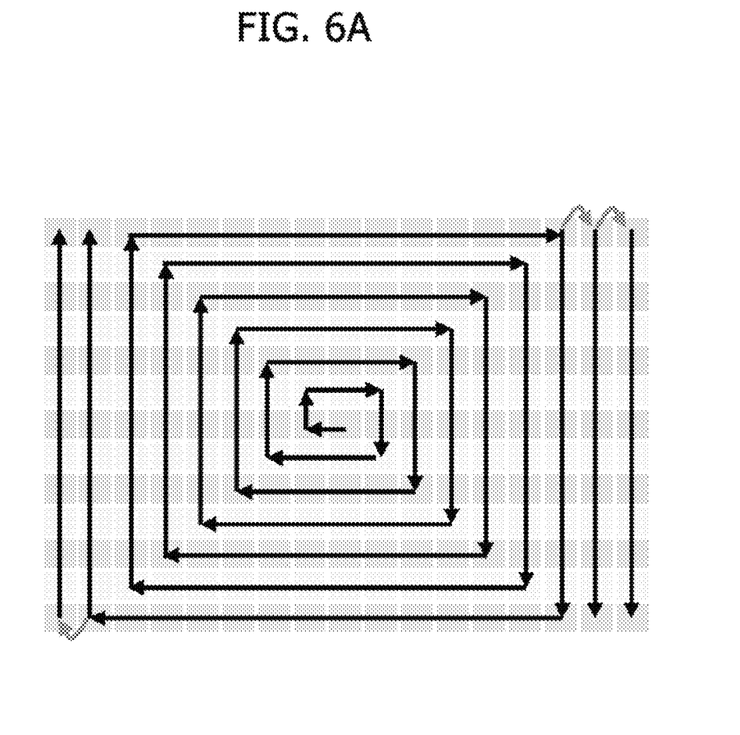
FIGS. 6A and 6B are diagrams illustrating a rectangular or circular spiral scanning technique on a center point basis.
Figure 6B:
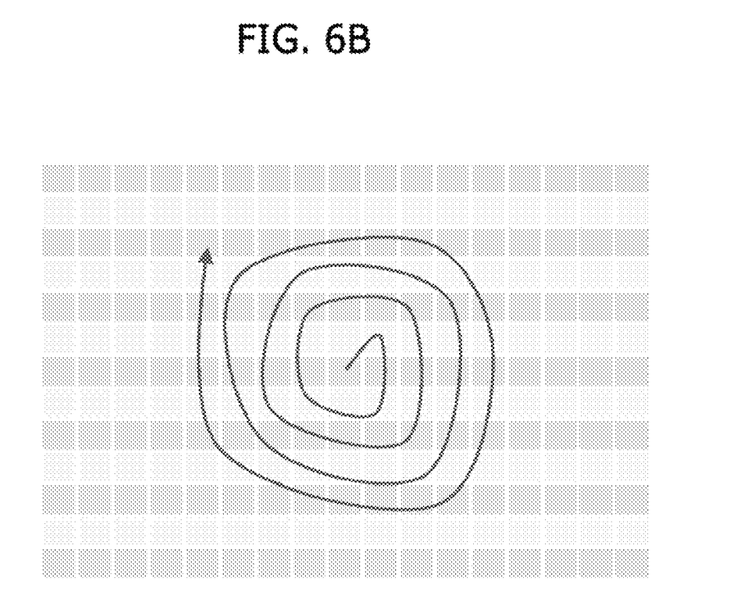

In 2D scanning of lens shading compensation coefficients, since neighboring lens shading compensation coefficients are highly similar, the DPCM is performed in a rectangular or circular spiral pattern around the center of the lens, starting at the center point for each of the four color channels, that is, the GB channel and the three differential channels, as illustrated in FIGS. 6A and 6B.

The third differential block 23 calculates the remaining lens shading compensation coefficient differentials based on weighted values.

For example, the third differential block 23 obtains a weighted value based on pixel distance, as shown in Equation 2, and performs a one-to-one differential operation between four color channels. This removes redundancy not removed through the DPCM process.

$$\left\{ \text{slope}(x, y) \middle| \begin{array}{l} x \neq 0 \text{ and } y \neq 0, \; \dfrac{|P(0, 0) - P(x, y)|}{\sqrt{(x^2 + y^2)}} \\ x = 0 \text{ and } y = 0, 0 \end{array} \right\} \quad \text{Equation 2}$$

$$\text{average\_one\_channel\_slope}(x, y) = \sum_{u=-6}^{6} \sum_{x=-8}^{8} \dfrac{|\text{slope}(x, y)|}{(\# \text{ of } x) \times (\# \text{ of } y)}$$

$$\text{Weight}_{value} = \dfrac{\text{avg\_1ch\_slope}_{GB} + \text{avg\_1ch\_slope}_{GR} + \text{avg\_1ch\_slope}_{Red} + \text{avg\_1ch\_slope}_{Blue}}{4}$$

where the x and y indicate data addressing coordinates for a weighted value operation;

the slope (x, y) indicates a slope of the x, y coordinates based on a center point;

the average_one_channel_slope (x, y) indicates an average of the slope of each coordinate center point for one channel; and the weight_value indicates an average of the slope of the center points for all the channels.

After decreasing the data range through lens shading compensation coefficient differential operations between and within the color channels, and a supplemental remaining lens shading compensation coefficient differential operation, the entropy coding block 24 performs entropy coding operations on the remaining lens shading compensation coefficients and compresses the remaining lens shading compensation coefficients once more, further reducing the amount of data needed to be stored.

The entropy coding block 24 obtains compressed data through the entropy coding operation on the remaining lens shading compensation coefficients of the four color channels, that is, the GB channel and the three differential channels, and decreases an amount of data, and may combine syntax information for the lens shading compensation coefficients and the compressed data into one bit stream.

Figure 7:
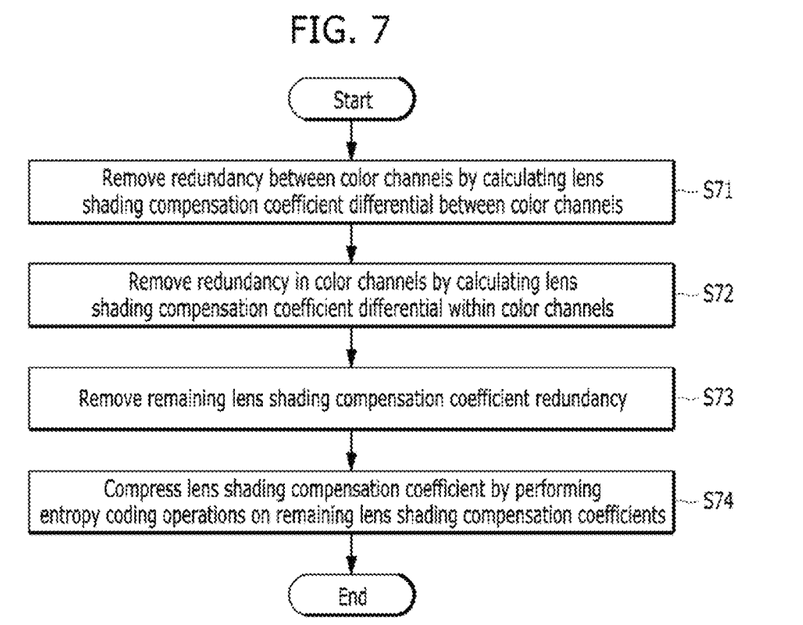
FIG. 7 is a flowchart describing a lens shading compensation coefficient compression method in accordance with an embodiment of the present invention.

FIG. 7 is a flowchart describing a lens shading compensation coefficient compression method in accordance with an embodiment of the present invention. Since a specific embodiment is provided in the description of the lens shading compensation coefficient compression device, with reference to FIG. 2, the operation processes are briefly described below.

The first differential block 21 calculates the lens shading compensation coefficient differentials between color channels and removes redundancy between the color channels in step S71. That is, the first differential block 21 removes the redundancy between the color channels by setting one color channel as a reference channel and calculates the lens shading compensation coefficient differentials between the color channels and the reference channel.

The second differential block 22 calculates the lens shading compensation coefficients within the color channels and removes redundancy within the color channels in step S72. The second differential block 22 calculates the lens shading compensation coefficient differentials within a single color channel.

The third differential block 23 calculates and removes the remaining lens shading compensation coefficient redundancy in step S73. That is, the third differential block 23 obtains a weighted value based on pixel distance and removes the remaining lens shading compensation coefficient redundancy. The removing of the remaining lens shading compensation coefficient redundancy in step S73 is optional.

Subsequently, the entropy coding block 24 performs entropy coding operations on the remaining lens shading compensation coefficients and compresses the lens shading compensation coefficients in step S74. That is, the entropy coding block 24 obtains the compressed lens shading compensation data by performing entropy coding operations on the remaining lens shading compensation coefficients and combines the syntax information for the lens shading compensation coefficients and the compressed data into a single bit stream.

Figure 8:
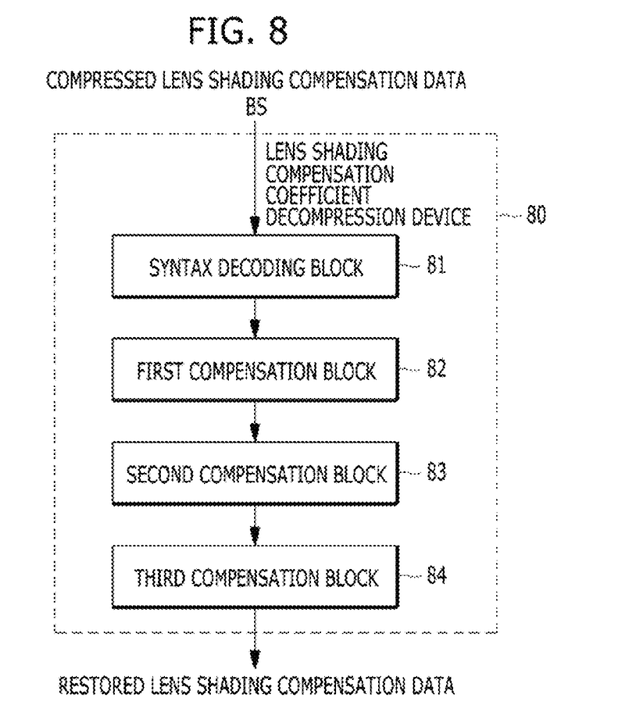
FIG. 8 is a block diagram illustrating a lens shading compensation coefficient decompression device in accordance with an embodiment of the present invention.

FIG. 8 is a block diagram illustrating a lens shading compensation coefficient decompression device in accordance with an embodiment of the present invention. Since the lens shading compensation coefficient is decompressed in a reverse fashion to the aforementioned lens shading compensation coefficient compression technique, it will be described briefly below.

Referring to FIG. 8, a lens shading compensation coefficient decompression device 80 includes a syntax decoding block 81, a first compensation block 82, a second compensation block 83, and a third compensation block 84. The syntax decoding block 81 extracts information required for generating the raw lens shading compensation coefficients by parsing a bit stream BS. The first compensation block 82 generates and compensates what was "the remaining lens shading compensation coefficients" based on weighted values. The second compensation block 83 generates and compensates the lens shading compensation coefficients within the color channels. The third compensation block 84 generates and compensates the lens shading compensation coefficients between the color channels. As was the case with compression, the first compensation block 82, corresponding to the third differential block 23 in FIG. 2, is an optional element.

Each of the constituent elements is described in detail below.

The bit stream BS compressed in the aforementioned coding process is encoded based on syntax sequence. The bit stream BS is divided into a header and data. Information related to the compression rate and reconstituting the compressed lens shading coefficients is stored in the header. For example, using the header, the entropy coding tool determines what compression performance is set, what amount of data is required for each color channel, and calculates the remaining lens shading compensation coefficient differentials based on distance.

Therefore, the syntax decoding block 81 extracts information required for lens shading coefficient generation by parsing the bit stream BS. The bit stream is then decoded and the information is transmitted to each differential module. Additionally, the syntax decoding block 81 initializes a decoding tool, used for decoding, that corresponds to the aforementioned coding tool.

The first compensation block 82 obtains the same weighted value as the distance based compression process and uses it to regenerate the lens shading compression coefficients. The first compensation block 82 obtains a weighted value P' of coordinates by multiplying the weighted value of the distance from a starting center point P, as shown in Equation 3, and decodes the lens shading compensation coefficients.

$$P'(x,y) = P(center\_x, center\_y) - Weight\_value \times \sqrt{((x^2 + y^2))}$$

Equation 3

The second compensation block 83 performs a spiral scanning operation on restored data based on a center value, such as, an average value or a reference value, of each channel and restores neighboring data values.

The third compensation block 84 adds redundancy between the color channels, increasing the compensation coefficient magnitudes to produce raw data, and restores all the color channels and the compensation coefficients. That is, the third compensation block 84 obtains three color channels by adding the restored differential channels and setting the GB channel as the reference channel, as shown in Equation 4.

Reference channel: GB frame

Restoration target channel: GR frame, Blue frame and Red frame $GR\text{-frame}(x,y) = GB\_frame(x,y) + Pred\_GB\text{-}GR(x,y)$ $Blue\_frame(x,y) = GB\_frame(x,y) + Pred\_GB\text{-}Blue(x,y)$ $Red\text{-}Red(x,y) = GB\_frame(x,y) + Pred\_GB\text{-}Red(x,y)$ Equation 4

Figure 9:
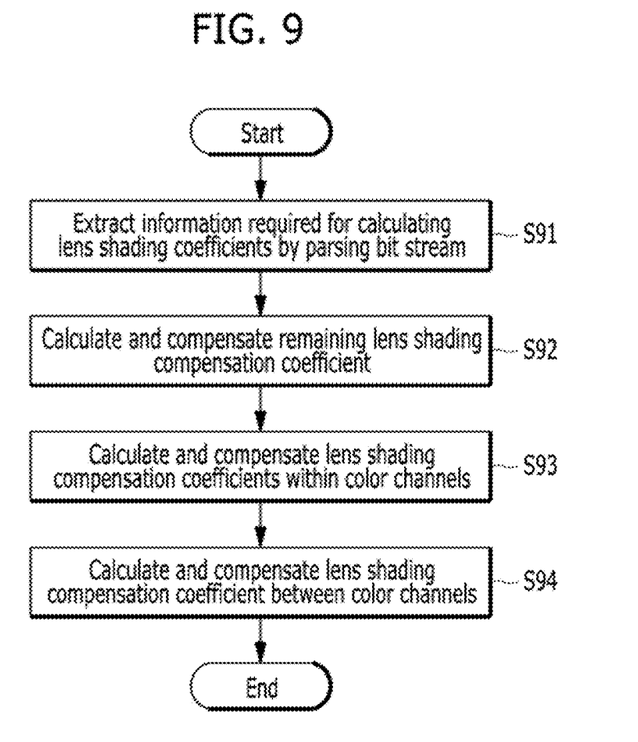
FIG. 9 is a flowchart describing a lens shading compensation coefficient decompression method in accordance with an embodiment of the present invention.

FIG. 9 is a flowchart describing a lens shading compensation coefficient decompression method in accordance with an embodiment of the present invention. Since a specific embodiment is provided in the description of the lens shading compensation coefficient decompression device with reference to FIG. 8, its operations are described briefly below.

The syntax decoding block 81 extracts information required for calculating each lens shading coefficients by parsing the bit stream in step S91.

The first compensation block 82 calculates and compensates the remaining lens shading compensation coefficients based on weighted averages in step S92. The calculating and compensating of the remaining lens shading compensation coefficient of step S92 is, as mentioned earlier, an optional step.

Subsequently, the second compensation block 83 generates the lens shading compensation coefficients within the color channels, in step S93.

Finally, the third compensation block 84 generates the lens shading compensation coefficients between color channels, in step S94.

In accordance with the embodiments of the present invention, a lens shading compensation coefficient compression and decompression method may be implemented through various computer means and recorded on a computer-readable medium. The computer-readable medium may include, alone or in combination, the program commands, data files, data structures, and the like. The program commands recorded on the media may be designed specifically for the purpose of the present invention or be known to those skilled in computer software. Examples of computer-readable recording mediums that can be incorporated into embodiments include magnetic media such as a hard disk, a floppy disk and a magnetic tape, optical recording media such as a CD-ROM and a DVD, magneto-optical media such as a floptical disk, and hardware devices that perform and store the program commands such as a ROM, a RAM and a flash memory. The media may also be transmission media such as optical or metallic lines and waveguides including carrier waves transmitting signals designating the program commands, data structures, and so on. Examples of program commands include advanced language code that may be executed by a computer using an interpreter as well as machine code created by a compiler. The hardware devices described above may operate as one or more software modules for performing the operations of the present invention.

In accordance with the embodiments of the present invention, by performing the entropy coding operation and compressing the lens shading compensation coefficients after reducing the data range of the lens shading compensation coefficients, the amount of data a CIS needs to store may be reduced. This is especially important as CIS image sensors continue to increase pixel density and have more sophisticated methods for calculating lens shading compensation coefficients. Additionally, since the total amount of data stored is reduced, the storage area of the nonvolatile memory in the CMOS Image sensor may also be reduced by about 20 to 33%, compared to storing the data without compression. Finally, the overall fabrication cost may be reduced by reducing the chip area required to form the CMOS image sensors.

While the present invention has been described with respect to specific embodiments, the embodiments are not intended to be restrictive, but rather descriptive. Further, it is noted that the present invention may be achieved in various ways through substitution, change, and modification by those skilled in the art without departing from the scope of the present invention as defined by the following claims.

What is claimed is:

1. A lens shading compensation coefficient compression device comprising:
    a first differential block suitable for calculating differentials between color channels;
    a second differential block suitable for calculating differentials within color channels; and
    an entropy coding block suitable for performing entropy coding on lens shading compensation coefficients,
    wherein the first differential block sets one color channel as a reference channel, calculates the lens shading compensation coefficient differentials between the color channels through a differential operation, and removes redundancy between the color channels using the calculated differentials between the color channels, and
    wherein the second differential block calculates the lens shading compensation coefficient differentials within the color channels through a differential operation between the lens shading compensation coefficients within the color channels and compresses the lens shading compensation coefficients using the calculated differentials within the color channels.

2. The lens shading compensation coefficient compression device of claim 1, further comprising:
    a third differential block suitable for predicting and removing remaining lens shading compensation coefficient redundancy.

3. The lens shading compensation coefficient compression device of claim 2, wherein the third differential block performs a differential operation with each color channel based on pixel distance weighted values.

4. The lens shading compensation coefficient compression device of claim 1, wherein the second differential block performs Differential Pulse Code Modulation (DPCM) using spiral scanning based on a center point of pixels.

5. The lens shading compensation coefficient compression device of claim 1, wherein the entropy coding block obtains compressed data by performing the entropy coding on remaining lens shading compensation coefficients and combines syntax information for the lens shading compensation coefficients and the compressed data as one bit stream.

6. A lens shading compensation coefficient compression method comprising:
    calculating by a first differential block, lens shading compensation coefficient differentials between color channels and removing redundancy between the color channels by the first differential block;
    calculating by a second differential block, lens shading compensation coefficient differentials within color channels and removing redundancy within the color channels by the second differential block; and
    performing entropy coding operations by a entropy coding block, on remaining lens shading compensation coefficients and compressing the lens shading compensation coefficients by the entropy coding block.

7. The lens shading compensation coefficient compression method of claim 6, further comprising:
    calculating and removing remaining lens shading compensation coefficient redundancy by a third differential block, after the calculating of the lens shading compensation coefficient differentials between the color channels and the removing of the redundancy within the color channels.

8. The lens shading compensation coefficient compression method of claim 6, wherein a Differential Pulse Code Modulation (DPCM) using spiral scanning based on a center point of the pixels is performed in the calculating of the lens shading compensation coefficient between the color channels and the removing of the redundancy within the color channels.

9. A lens shading compensation coefficient decompression device comprising:
    a syntax decoding block suitable for parsing a bit stream and extracting information required for calculating lens shading compensation coefficient differentials;
    a second compensation block suitable for calculating and compensating a lens shading compensation coefficient within color channels based on the lens shading compensation coefficient differentials; and
    a third compensation block suitable for calculating and compensating a lens shading compensation coefficient between color channels based on the lens shading compensation coefficient differentials,
    wherein the second compensation block uses the compensated lens shading compensation coefficients within color channel to perform a spiral scanning operation on restored data based on an average value or a reference value, of each channel and restores neighboring data values, and
    wherein the third compensation block uses the compensated lens shading compensation coefficients between color channels to add redundancy between the color channels, increasing compensation coefficient magnitudes to produce raw data, and restores all the color channels and the compensation coefficients.

10. The lens shading compensation coefficient decompression device of claim 9, further comprising:
a first compensation block suitable for calculating and compensating a remaining lens shading compensation coefficient based on weighted averages.

11. A lens shading compensation coefficient decompression method comprising:
parsing a bit stream by a syntax decoding block and extracting information required for respective differentials by the syntax decoding block;
calculating and compensating a lens shading compensation coefficient within color channels by a second compression block; and
calculating and compensating a lens shading compensation coefficient between color channels by a third compression block.

12. The lens shading compensation coefficient decompression method of claim 11, further comprising:
calculating and compensating a remaining lens shading compensation coefficient after the parsing of the bit stream and the extracting of the information required for the respective differentials by a first compression block.

13. A lens shading compensation coefficient compression method comprising:
calculating differentials of lens shading coefficients between color channels by a first differential block;
calculating differentials of lens shading coefficients within color channels by a second differential block;
composing data, which includes the calculated differentials between and within the color channels by a entropy coding block;
and entropy encoding the data by the entropy coding block.

14. The method of claim 13, further comprising:
calculating differentials based on distance weighted values by a third differential block.

15. The method of claim 14, wherein a distance used in the distance weighted values is measured from a center of pixels.

16. The method of claim 15, wherein the data that is entropy encoded farther includes the differentials calculated based on distance weighted values.

17. The method of claim 16, wherein the calculating differentials of lens shading coefficients within color channels is accomplished using Differential Pulse Code Modulation (DPCM).

* * * * *